US010963165B2

(12) United States Patent
Sahin et al.

(10) Patent No.: US 10,963,165 B2
(45) Date of Patent: Mar. 30, 2021

(54) APPLYING VIRTUAL MACHINE PERFORMANCE OBJECTIVES ON A STORAGE SYSTEM

(71) Applicant: EMC IP Holding Company LLC, Hopkinton, MA (US)

(72) Inventors: Adnan Sahin, Needham, MA (US); Owen Martin, Hopedale, MA (US); Sanjib Mallick, Karnataka (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 16/263,050

(22) Filed: Jan. 31, 2019

(65) Prior Publication Data

US 2020/0249847 A1      Aug. 6, 2020

(51) Int. Cl.
*G06F 3/06* (2006.01)
*G06F 9/455* (2018.01)

(52) U.S. Cl.
CPC ............ *G06F 3/0611* (2013.01); *G06F 3/067* (2013.01); *G06F 3/0632* (2013.01); *G06F 3/0662* (2013.01); *G06F 9/45558* (2013.01); *G06F 2009/45579* (2013.01); *G06F 2009/45595* (2013.01)

(58) Field of Classification Search
CPC ........... G06F 2009/45579; G06F 3/067; G06F 3/0604; G06F 3/061; G06F 3/0659
See application file for complete search history.

(56) References Cited

U.S. PATENT DOCUMENTS

| | | |
|---|---|---|
| 2008/0098392 A1 | 4/2008 | Wipfel et al. |
| 2013/0262649 A1 | 10/2013 | Shimmitsu et al. |
| 2014/0115228 A1 | 4/2014 | Zhou et al. |
| 2016/0292116 A1 | 10/2016 | Wakhare et al. |
| 2017/0206107 A1* | 7/2017 | Guha ............... G06F 3/0647 |
| 2020/0050470 A1* | 2/2020 | Guo ................. G06F 3/0679 |

OTHER PUBLICATIONS

Adnan Sahin, et al., "Associating Storage System Performance Objectives With Virtual Machines," U.S. Appl. No. 16/263,033, filed Jan. 31, 2019.

* cited by examiner

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

Service level objectives (SLOs) defined for a storage system are associated with VMs running on hosts. For an I/O operation for a virtual machine (VM) running on a host system, storage processing is performed on the I/O operation in accordance with the SLO defined for the VM. The same storage system-defined SLOs may be applied to VMs running on multiple host systems. SLOs may be maintained by the storage array and shared with one or more host systems in I/O communication with the storage system. SLOs may be defined using a user interface of a storage system, host system, virtualizer control station or other component of a storage network, and communicated to the storage system, which may maintain the SLOs, and may disseminate them to one or more hosts. The SLOs then may be associated with VMs running on the hosts and tagged to I/O communications corresponding to the VMs.

20 Claims, 9 Drawing Sheets

| SLO ID | SLO Name | Response Time Objective | Other Info |
|---|---|---|---|
| 0 | n/a | n/a | |
| 1 | Diamond | < 1 microsecond | |
| 2 | Platinum | Minimum response time = 1 microsecond | |
| 3 | Gold | Minimum response time = 3 microseconds | |
| 4 | Silver | Minimum response time = 6 microseconds | |
| 5 | Bronze | Minimum response time = 10 microseconds | |

FIG. 1A

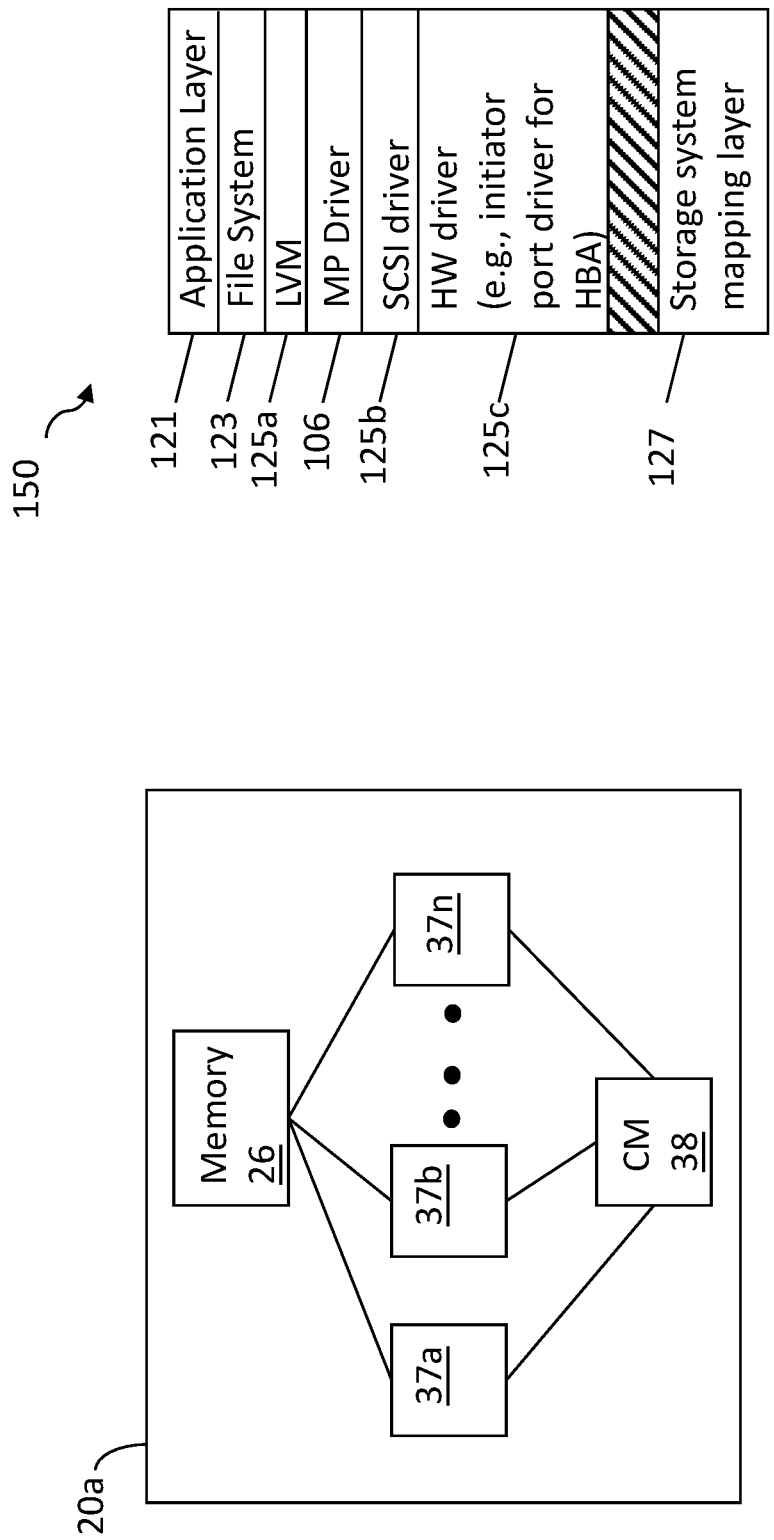

APPLYING VIRTUAL MACHINE PERFORMANCE OBJECTIVES ON A STORAGE SYSTEM

BACKGROUND

Technical Field

This application generally relates to data storage and, in particular, I/O performance on a data storage system.

Description of Related Art

Data storage systems may include resources used by one or more host systems (i.e.,"hosts"). Data storage systems and host systems may be interconnected by one or more communication connections such as in a network. These resources may include, for example, data storage devices such as those included in the data storage systems manufactured by EMC Corporation of Hopkinton Mass. ("Dell EMC"). These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations that are sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform I/O operations through the channels to the data storage system, and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

A host system may host applications that utilize storage devices of the storage system. For a given application, to perform I/O operations utilizing a storage device of the storage system, one or more components of each of: a host; a switch; and a storage system may be used; i.e., communications for performing I/O operations may be transmitted through these one or more components. The one or more combinations of components of the host, switch and storage system over which I/O operations between an application and storage device can be communicated may be considered an I/O path between the application and the storage device. These I/O paths define a connectivity of the storage network.

On some data storage networks, virtualization technology may be employed on the host, in which a virtualizer (e.g., an ESXi™ hypervisor made available from VMware, Inc. of Alto, Calif.) virtualizes hardware components, and may serve as a hypervisor that in some cases can be considered an operating system (OS), which allows multiple virtual machine (VMs) to be run on the host concurrently, sharing hardware resources.

SUMMARY OF THE INVENTION

In some embodiments of the invention, service level objectives defined for a storage system of a storage network are applied to virtual machines defined for one or more host systems of the storage network. The method includes: defining a plurality of service level objectives for the storage system to apply to I/O operations on the storage system, receiving an I/O communication including an I/O operation to be performed for a first virtual machine of a plurality of virtual machines defined for the one or more host systems, determining a first service level objective, of the plurality of service level objectives, assigned to the first virtual machine, and processing the I/O operation on the storage system in accordance with the determined first service level objective. The method may include one or more of: communicating the plurality of service level objectives to one or more other components of the storage network, where the one or more other components include the one or more host systems and/or a virtualizer control station on the storage network, receiving information for the plurality of virtual machines, the information including, for each of the plurality of virtual machines, a service level objective assigned to the virtual machine, and storing the received information in a data structure on the storage system, the data structure including a plurality of entries, each entry representing one of the plurality of virtual machines. Determining the first service level objective may include reading a field of the I/O communication that specifies the service level objective.

In some embodiments, a system for applying service level objectives defined for a storage system of a storage network to virtual machines defined for one or more host systems of the storage network includes one or more processors and memory comprising code stored thereon that, when executed, performs the above-described method.

In some embodiments, one or more computer-readable media, for example, non-transitory computer-readable media, have software stored that define the above-described method of applying service level objectives defined for a storage system of a storage network to virtual machines defined for one or more host systems of the storage network.

BRIEF DESCRIPTION OF THE DRAWINGS

Features and advantages of the present invention will become more apparent from the following detailed description of illustrative embodiments thereof taken in conjunction with the accompanying drawings in which:

FIG. 1A is a block diagram illustrating an example of a service level objective table.

FIG. 2B is a block diagram illustrating an example of logical internal communications between directors and memory of the data storage system of FIG. 2A according to embodiments of the invention;

FIG. 4 is a block diagram illustrating an example of a plurality of logical layers of a combination of a host system and a data storage system for processing an I/O request, according to embodiments of the invention;

DETAILED DESCRIPTION OF EMBODIMENTS

Figure 1B:
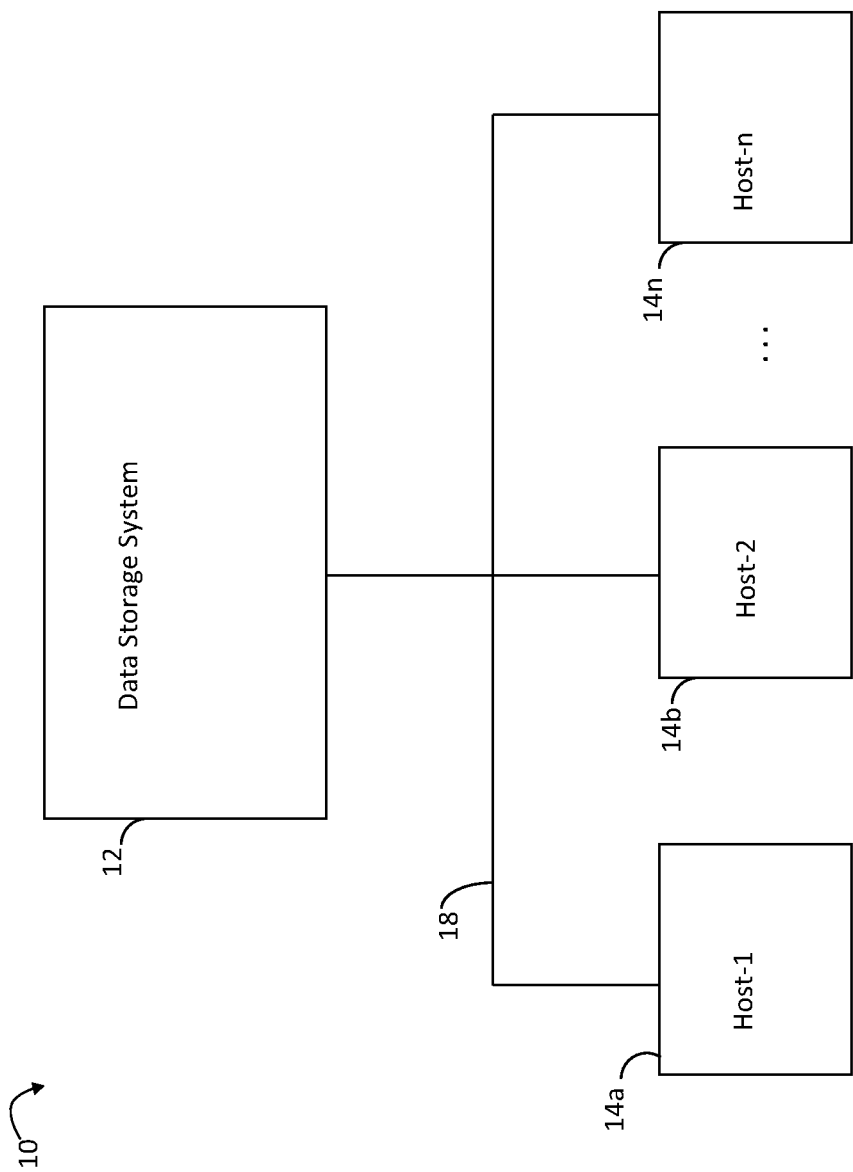
FIG. 1B is a block diagram illustrating an example of a system according to embodiments of the invention.

On some data storage networks, service levels objectives (SLOs) or the like may be defined and used, each SLO specifying one or more I/O performance objectives. For example, performance objectives may include any of a variety or types of performance objectives corresponding to I/O workloads, for example, average response time, average response time for reads or writes specifically, a read cache hit rate threshold, a workload volume threshold, a workload volume density threshold, other performance objectives, performance objectives corresponding to one of the foregoing, or any suitable combination of the foregoing. A storage system may define SLOs that then may be associated with (e.g., assigned to) one or more storage devices or groups of storage devices defined on the storage system, where each storage group may be associated with one or more applications running on hosts.

FIG. 1A is a block diagram illustrating an example of a SLO table 1. It should be appreciated that other embodiments of an SLO table, for example, variations of SLO table 1, are possible, and are intended to fall within the scope of the invention.

SLO table 1 may include a plurality of entries 9, including entries 9a-9f. Each entry may represent an SLO, and may specify: an SLO ID (e.g., number) in column 2, an SLO name in column 4, a response time objective (or one or more other performance objectives) in column 6, and other information in column 8. SLO table 1 illustrates SLOs 1-5 having respective names: Diamond, Platinum, Gold, Silver and Bronze may, each specifying a different performance objective. Table 1 also specifies in entry 9a an SLO ID of 0, meaning that no SLO has been specified. For SGs (and VMs in accordance with embodiments of the invention as described in more details below) having and SLO=0, I/O operations may be treated as Optimized as described in more detail below.

For example, if Diamond SLO is assigned to a Storage Group (SG) 1 and Gold SLO is assigned to SG 2, the storage system may be configured to try to achieve an average I/O time for SG 2 of 3 microseconds, but no less than 3 microseconds, and have an average I/O time for SG 1 of less than one microsecond. The system may be configured to give higher priority to achieving the higher priority SLO (e.g., corresponding to lower RT). For example, in the above example, if SG 2 is experiencing a high volume of I/O such that attempting to achieve its Gold SLO is making it difficult or impossible to achieve the Diamond SLO for SG 1, then the response time objective for Gold may be raised, e.g., to 5 seconds, and one or more of the other SLO response time objectives may be adjusted as well. By raising the response time objective of one or more of the lower priority SLOs, the system may devote less resources to achieving workloads for SGs assigned these SLOs, and thus may devote more resources to the higher-priority SLO, thereby increasing the probability of achieving the response time objective of the higher-priority SLO for SGs to which it is assigned. It should be appreciated that any number of SLOs having any of a variety of performance objectives (including combinations of performance objectives) may be defined. In some embodiments, if no SLO corresponding to a response time objective is defined for a storage device (or if SLO=0), then an SLO of Optimized may be assigned (e.g., Optimized may serve as a default SLO), in which all I/Os for the storage device will be treated on a first-come, first-served basis relative to I/Os of other storage devices, regardless of the SLOs of the other storage devices. It should be appreciated that, if all active storage devices are assigned an SLO of Diamond in the above example, then the I/O of each storage device will receive the same treatment as if it had an SLO of Optimized. In some embodiments, all SGs and/or VMs are initialized to an SLO=0 (Optimized) until another SLO is assigned thereto. It should be appreciated that, in accordance with some embodiments of the invention, SLOs may be applied to VMs and modified in a same or similar manner as described above in relations to SGs.

SLOs also may be defined and applied on host systems. For example, some currently available virtualization solutions deploy limited variations of SLOs on a per-VM basis, where the SLOs are defined and enforced on the host system by a virtualizer of a host system. The host system may perform I/O operations with a storage system for its VMs, and apply virtualizer-based per-VM SLOs to the VM, but the storage system is not aware of such SLOs. Thus, on the storage system, virtualizer-based, per-VM SLOs are not applied, and the storage system may apply its own storage-system-based SLOs, which do not take into account the VMs associated with I/O operations. Thus, an I/O operation may have an associated SLO on a host system that is different than an SLO associated with the I/O operation on a storage systems, which may result in different priority treatment being afforded the I/O operation on the host and storage system.

Further, each host system (e.g., server) or virtualizer thereof may define its own SLOs and act independently of the other host systems, and, because the storage system is not aware of the host- or virtualizer-based SLOs, there may be no cross-host enforcement. As a result, one host system may consume a disproportionate amount of storage array resources outside of the control of the storage system.

Described herein are innovative systems and techniques that include associating SLOs defined for a storage system with VMs running on one or more hosts, and, for an I/O operation of a VM, performing storage processing on the storage system in accordance with the SLO defined for the VM. The same storage system-defined SLOs may be applied to VMs running on multiple host systems. SLOs may be maintained by the storage array and shared with one or more hosts communicatively coupled to perform I/O with the storage system. For example, SLOs may be defined using a user interface of a storage system, host, virtualizer control station (e.g., a vCenter™ system made available by VMware) or other component of a storage network, and communicated to the storage system, which may maintain the SLOs, and may disseminate them to one or more hosts. Thus, the same SLOs may be used by the host system and a plurality of hosts, two or more of which may be made available from different vendors. A virtualizer control station (VCS) may be configured to access, configure and manage virtualizers and VMs residing on one or more host systems of a storage network.

In some embodiments, a VCS may include a storage interface component (SIC); e.g., a Virtual Storage Integrator (VSI) made available by Dell EMC, that enables communication between a storage system and the VCS. An SIC (e.g., an extension thereof) may be configured to enable a storage system (or a user interface component thereof) to exchange SLO information with the VCS. For example, a storage system-specific SIC plug-in/adapter/extension (hereinafter "plugin") may be configured to map SLO information between the storage system and the VCS. For example, the storage system may communicate SLOs defined on the storage system to the VCS via the storage system-specific plugin to the SIC. A user, utilizing a UI and/or programmatic API, CLI and/or REST interface, and/or other type of interface of the VCS or the storage system, may associate an SLO with one or more VMs, which may be persisted, maintained and controlled by the storage system, for example, in a table of VM name:SLO pairs. In some embodiments, VMs for which an SLO definition is not desired may default to being "optimized" (e.g., no special treatment afforded by the array).

SLOs defined for VMs may be communicated between a VCS, storage system, host and other components of the data storage network as VM Name:SLO pairs or in any other suitable manner. The VM Name may be world-wide unique, and may be persisted in memory of the storage system and perhaps other components of the storage network.

Each time a host system is rebooted, the host system may determine VM-SLO assignments from storage system on which the assignments are persisted, or other components of the storage network on which the VM-SLO assignments are persisted. For example, a multi-path driver (MP driver); e.g., a multipath I/O engine (MPIO) of the host system (e.g., PowerPath made available by Dell EMC) may issue a vendor-unique (VU) SCSI command to the storage system to read a table of VM Name:SLO pairs. The host system may store its own table of VM Name:SLO pairs, e.g., in cache, based on the table read from the storage system. In some embodiments, The MP driver may determine the name of each of the VMs running on the host from the virtualizer, for example, using VM handles provided by the virtualizer, and may refine the table of VM Name:SLO pairs to only include the VMs active on the host system. In some embodiments, the table of VM Name:SLO pairs includes the SLO ID (number) of the SLO (e.g., 0-5).

In response to receiving an I/O request including an I/O operation from an application of a VM running on the host (e.g., via the virtualizer), the MP driver may determine the originating VM Name for the I/O request, and determine the SLO value (number and/or name) assigned to the VM from the table of VM name:SLO pairs. The MP driver may tag an I/O communication to be sent to the storage system, which includes the I/O operation, with the determined assigned SLO value, e.g., using a vendor-unique (VU) SCSI command. For example, a 5-bit group-ID field of a SCSI Command Descriptor block (CDB) may be used to specify a number (or other value) corresponding to the SLO. The storage system may receive the I/O communication including the SLO-value tag, and manage the I/O operation on the storage system per the SLO, e.g., per the information about the SLO provided in an SLO table.

Illustrative embodiments of the invention will now be described in more detail in relation to the figures.

Referring now to FIG. 1B, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1B, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
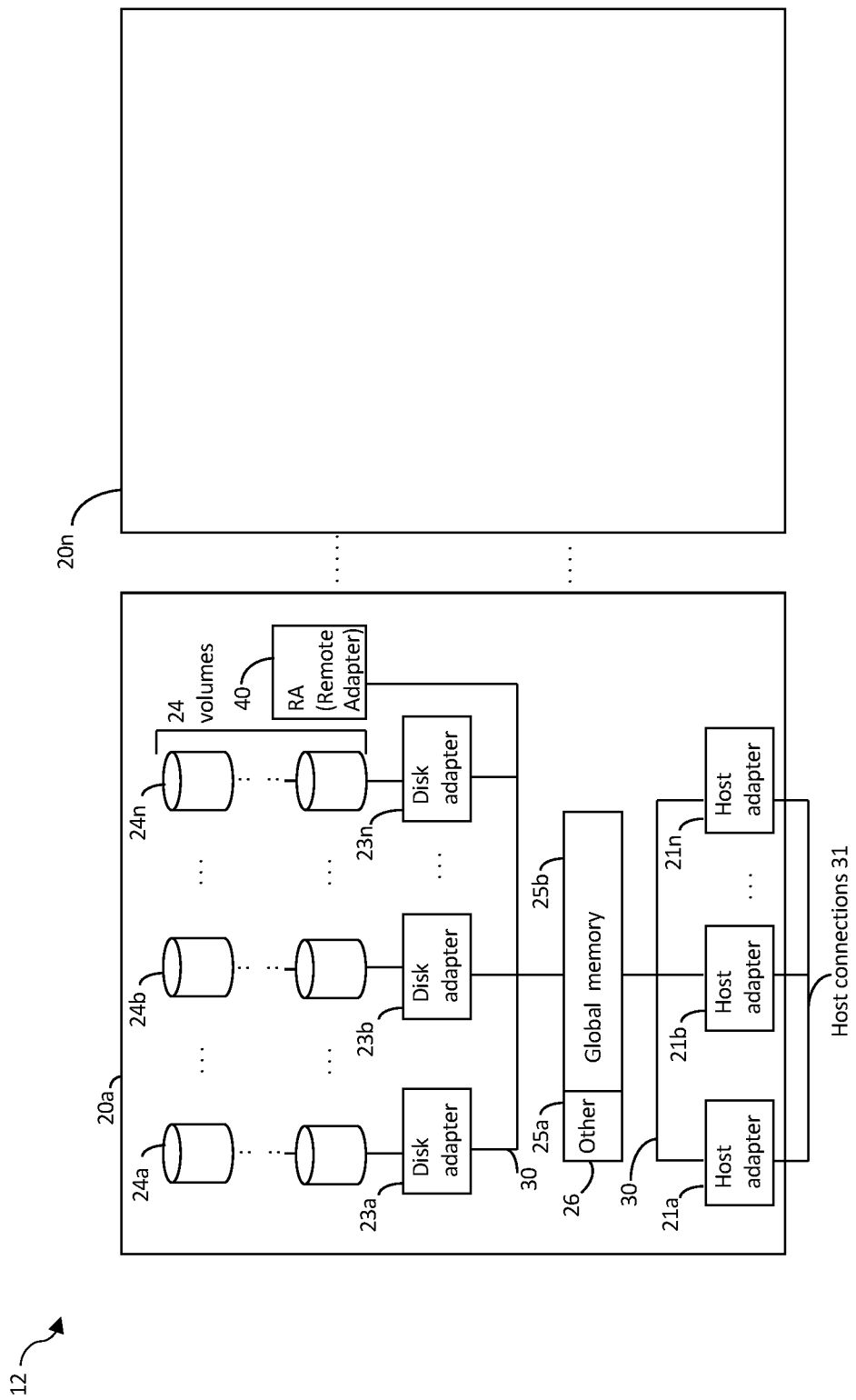
FIG. 2A is a block diagram illustrating an example of a data storage system according to embodiments of the invention.

Referring now to FIG. 2A, shown is an example of an embodiment of the data storage system 12 that may be included in the system 10 of FIG. 1B. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20*a*. It should be noted that a similar more detailed description also may apply to any one or more of the other elements, such as 20*n,* but have been omitted for simplicity of explanation. It should also be noted that an embodiment may include data storage systems from one or more vendors. Each of 20*a*-20*n* may be resources included in an embodiment of the system 10 of FIG. 1B to provide storage services to, for example, host computer systems.

Each of the data storage systems, such as 20*a,* may include a plurality of physical data storage devices (e.g., physical non-volatile storage devices), such as disk devices or volumes, for example, in an arrangement 24 consisting of n rows of disks or volumes 24*a*-24*n*. In this arrangement, each row of disks or volumes may be connected to a disk adapter ("DA") or director responsible for the backend management of operations to and from a portion of the disks or volumes 24. In the system 20*a,* a single DA, such as 23*a,* may be responsible for the management of a row of disks or volumes, such as row 24*a*. System 20*a* also may include a fabric that enables any of disk adapters 23*a*-23*n* to access any of disks or volumes 24-24N, in which one or more technologies and/or protocols (e.g., NVMe or NVMe-oF) may be employed to communicate and transfer data between the DAs and the disks or volumes. The system 20*a* also may include one or more host adapters ("HAs") or directors 21*a*-21*n*. Each of these HAs may be used to manage communications and data operations between one or more host systems and the global memory. In an embodiment, the HA may be a Fibre Channel Adapter or other type of adapter which facilitates host communication.

Also shown in the storage system 20*a* is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25*b* may be used to facilitate data transfers and other communications between the DAs, HAs and RAs in a data storage system. In one embodiment, the DAs 23*a*-23*n* may perform data operations using a cache that may be included in the global memory 25*b,* for example, in communications with other disk adapters or directors, and other components of the system 20*a.* The other portion 25*a* is that portion of memory that may be used in connection with other designations that may vary in accordance with each embodiment.

It should be generally noted that the elements 24*a*-24*n* denoting physical storage devices may be any suitable physical storage device such as a rotating disk drive, flash-based storage, and the like. The particular data storage system as described in this embodiment, or a particular physical storage device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25*b*) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37*a*-37*n* coupled to the memory 26. Each of the directors 37*a*-37*n* represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host. The unqualified term "storage device" as used herein means a logical device or physical storage device.

Storage system 12 or one or more components thereof described in relation to FIGS. 1B-2B may be implemented using one or more Symmetrix®, VMAX® or VMAX3® systems (hereinafter referred to generally as VMAX storage systems) made available from Dell EMC.

Figure 3:
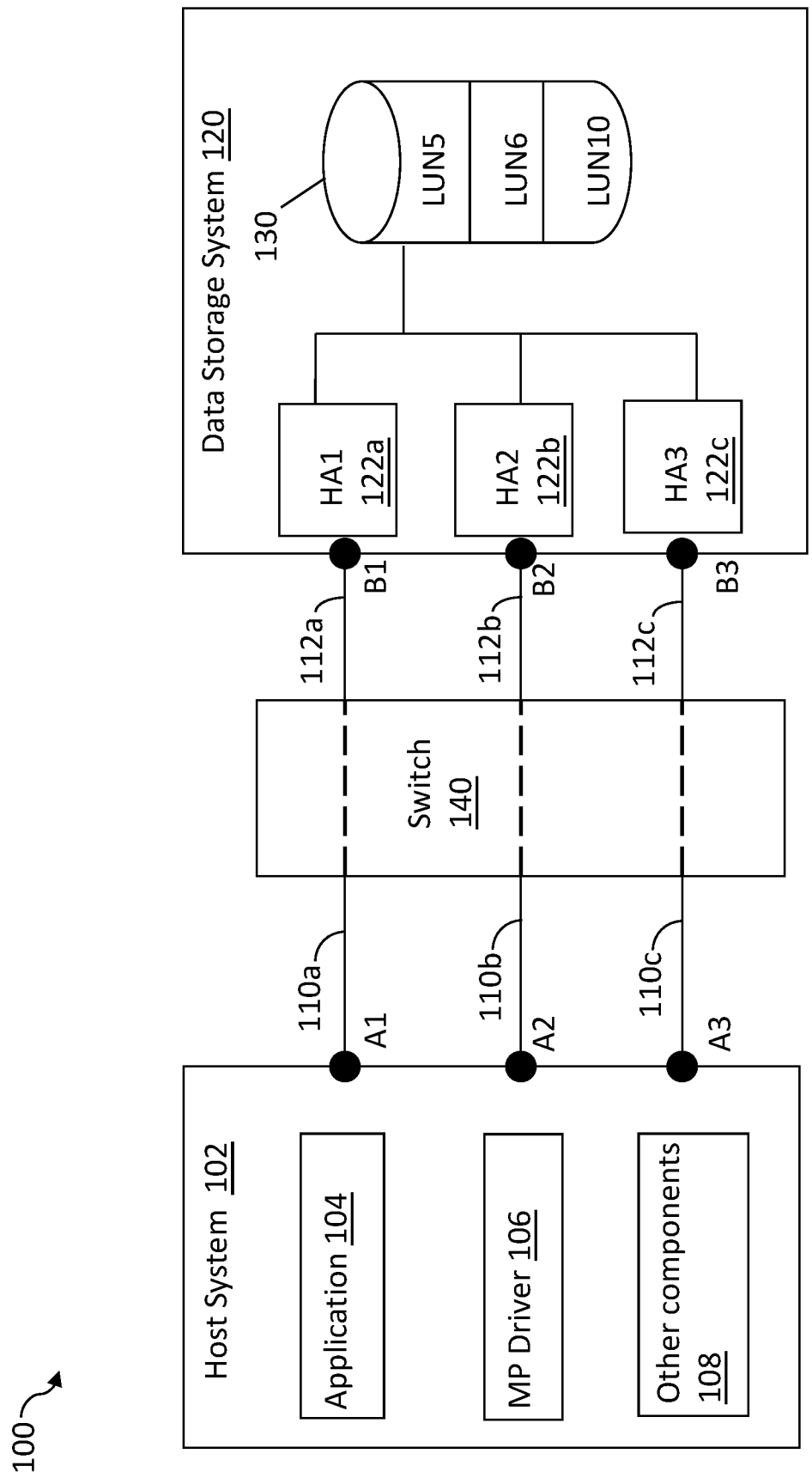
FIG. 3 is a block diagram illustrating an example of a system including a host system communicatively coupled to a data storage system via multiple I/O paths, according to embodiments of the invention.

FIG. 3 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 12 and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include three LUNs—LUN5, LUN6 and LUN10. It should be noted that the system 100 includes only a single host system 102, single physical device 130 with 3 LUNs, a single data storage system 120, and a single switch for purposes of simplicity to illustrate the techniques herein. For example, each of the LUNs may be configured to have storage provisioned from multiple different physical devices rather than a single physical device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LUNs of device 130, configured to be accessible to the host system 102 over multiple I/O paths. As such, each of the I/O operations may be forwarded from the application 104 to the data storage system 120 over one of the possible multiple I/O paths. The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical data storage devices, such as device 130, where each such physical device may be configured to store data of one or more LUNs. Each of the LUNs having data stored on the device 130 may be configured to be accessible to the host system 102 through one or more I/O paths. For example, all LUNs of 130 may be accessible using ports of the three front-end directors or interfaces 122a-122c, also denoted respectively as host adapters HA1, HA2 and HA3. The multiple I/O paths allow the application I/Os to be routed over multiple I/O paths and, more generally, allow the LUNs of device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LUNs of the device 130 in order to determine which of the multiple I/O paths are active or available at a point in time, which of the multiple I/O paths are unavailable for communications, and to use such information to select an I/O path for host system-data storage system communications.

In the example of the system 100, each of the LUNs of the device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LUNs of the device 130 may be accessible over three I/O paths—a first I/O path represented by A1-B1, a second I/O path represented by A2-B2 and a third I/O path represented by A3-B3.

FIG. 4 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 4 provides further detail regarding various software layers that may be used in connection with the MP driver 106 of FIG. 3. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host system may perceive as corresponding to a physical device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 3. More generally, one or more layers between the application layer 121 and the MP driver 106, for example, the file system 123, may provide for mapping a LUN (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LUN known or exposed to the host system may not directly correspond to a physical device such as a disk drive. In such embodiments, the LUN specified by the host system in the I/O operation may be further mapped by the data storage system using its mapping layer 127. For example, a LUN specified by the host system may be mapped by the data storage system to one or more physical drives, and multiple LUNs may be located on a same physical device, multiple physical drives, and the like.

The MP driver 106, as well as other components illustrated in FIG. 4, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LUNs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-I/O commands such as related to host system control operations. I/O operations may include, for example, read and write operations with respect to data stored on a LUN.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 3) and a second endpoint which is a port of an HA (e.g., such as B1-B3 of FIG. 3) in the data storage system. Through each such I/O path, one or more LUNs may be visible or exposed to the host system initiator through the target port of the data storage system.

Figure 5:
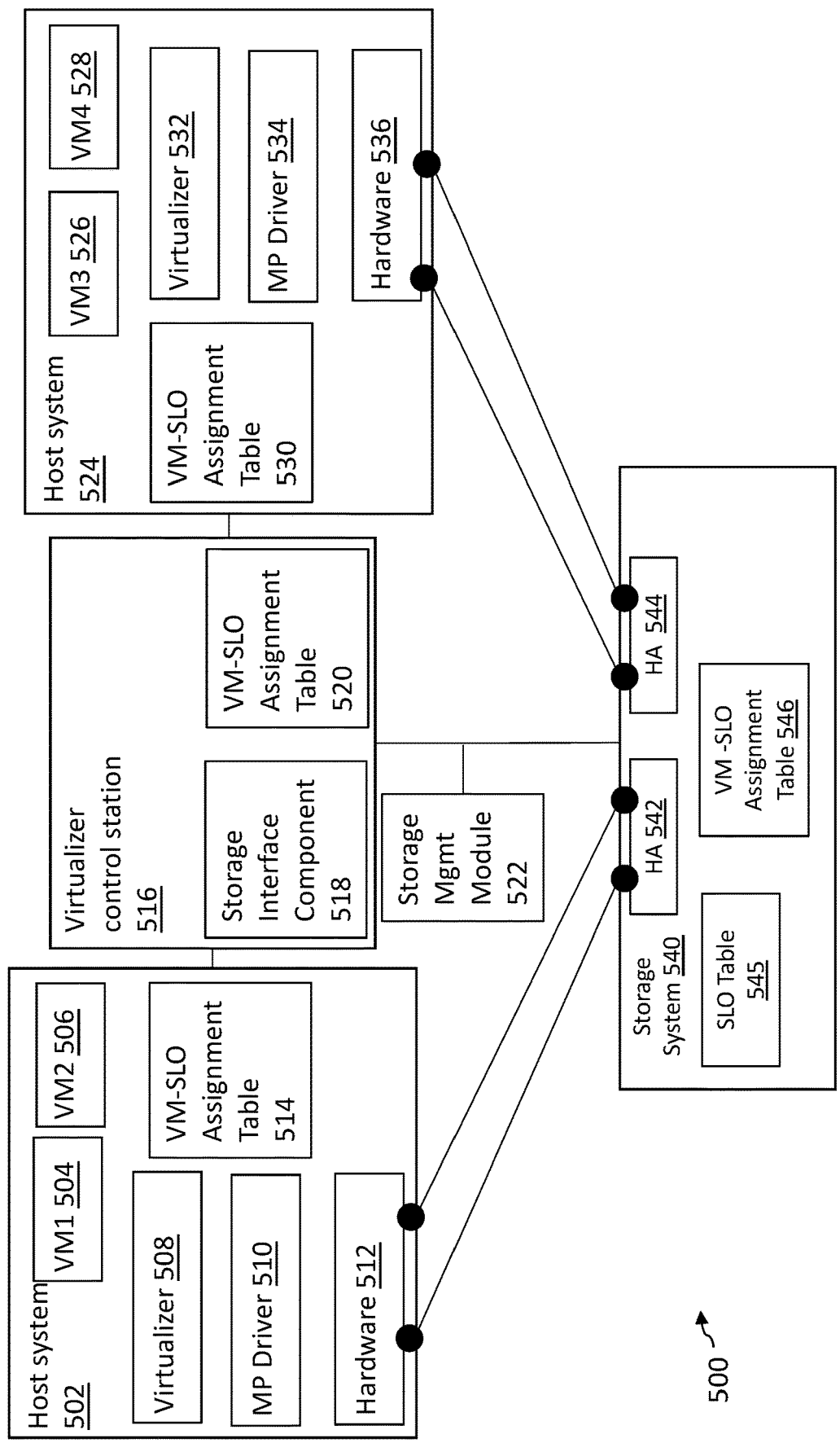
FIG. 5 is a block diagram illustrating an example of a storage network for associating service objectives defined by a storage system with virtual machines running on host systems, according to embodiments of the invention.

FIG. 5 is a block diagram illustrating an example of a storage network 500 for associating SLOs defined by a storage system with VMs or the like running on host systems, according to embodiments of the invention. Other examples of a storage network for associating SLOs defined by a storage system with VMs running on host systems, for example, variations of storage network 500, are possible and intended to fall within the scope of the invention. Storage network 500 may include one or more host systems 502, 524, a VCS 516 and one or more storage systems, for example, storage system 540.

VCS 516 may be configured to access, configure and manage virtualizers (e.g., 508, 532) and VMs (e.g., any of VMs 504, 506, 526 and 528) residing on one or more host systems (e.g., 502, 524) of storage network 500. VCS 516 may be configured to define one or more VMs, including giving an identifier to each VM. In some embodiments, each VM identifier (e.g., name) is unique with respect to other VMs within storage network 500 such that no two or more VMs have the same identifier. For example, VCS 516 may ensure that each VM is given a unique name within storage network 500. In some embodiments of the invention, each VM is world-wide unique such that no two or more VMs in storage network 500 or other storage networks in communication with storage network 500 have a same identifier. For example, VCS 516 may be in communication with one or more VCSs from other storage networks and may be configured to ensure that each VM in network 500 is given a unique name worldwide.

VCS 516 may include a VM-SLO assignment table 520 and one or more SICs 518 and/or plugins thereof. Each SIC 518 and/or a plugin thereof may enable communication between a storage system (e.g., 540) and VCS 516. For example, a storage system-specific SIC plugin within SIC 518 may be configured to map SLO information between storage system 540 and VCS 516. For example, storage system 540 may communicate SLOs defined on storage system 540 to VCS 516 via a storage system-specific plugin to the SIC 518. A user, utilizing a UI and/or programmatic API, CLI and/or REST interface, and/or other type of interface of VCS 516 or storage system 540, may associate (e.g., assign) an SLO with one or more VMs, which may be maintained and controlled by the storage system. The assignments of SLOs to VMs may be stored in VM-SLO assignment table 520, which may be implemented as VM-SLO assignment table 600 described in more detail in relation to FIG. 6.

Figure 6:
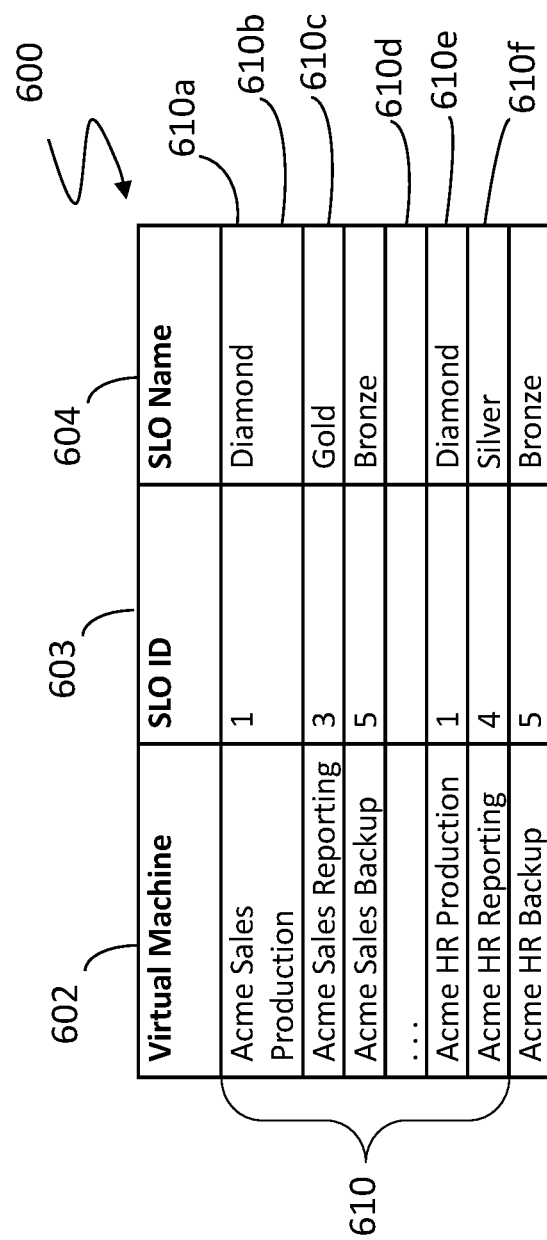
FIG. 6 is a block diagram illustrating an example of a data structure associating virtual machines with service level objectives, according to embodiments of the invention.

FIG. 6 is a block diagram illustrating an example of a data structure (e.g., table) 600 associating VMs with SLOs, according to embodiments of the invention. Other examples of a data structure 600 associating VMs with SLOs, for example, variations of data structure 600, are possible and intended to fall within the scope of the invention. For illustrative purposes, data structure 600 is often referred to herein as VM SLO assignment table 600, but it should be appreciated that other types of data structures may be used, for example, linked lists and object-oriented data structures.

VM SLO assignment table 600 may include a plurality of entries 610, including entries 610a-610f. Each entry may correspond to a VM, the name of which may reside in VM name column 602, and each entry may specify an ID (e.g., integer) identifying an SLO in SLO ID column 603 and a name identifying the SLO in SLO name column 604. For example, entry 610c indicates that the VM named "Acme Sales Back" has an assigned SLO ID of 5 for the SLO name Bronze. The VM SLO assignment table 600 may be populated by a VCS and shared with the a storage system and/or one or more host systems as described in more detail elsewhere herein.

Returning to FIG. 5, information within VM-SLO assignment table 520, including SLOs defined for VMs, may be communicated between VCS 516, storage system 540, host systems 502 and 524 and/or other components of storage network 500 as VM Name:SLO pairs, for example, as described in more detail elsewhere herein. The SLO portion of the VM Name: SLO pair may be the SLO ID or the SLO name. In some embodiments, information within VM-SLO assignment table 520 may be communicated as VM Name: SLO triplets, which include the SLO ID and the SLO name.

Storage system 540 may be, include, or be included within any of data storage systems 12, 20a or 120 described in more detail above. Storage system 540 may include one or more host adapters, e.g., HAs 542, 544, each of which may include one or more ports communicatively coupled to ports of one or more host systems (e.g., host systems 502 and 524). The storage system may include an SLO table 545, which may be implemented as SLO table 1 described in relation to FIG. 1A, and may include VM-SLO assignment table 546 that holds assignments of SLOs to VMs, which may be implemented, for example, as VM SLO assignment table 600 described in more detail in relation to FIG. 6. VM-SLO assignment table 546 may be populated with information received from VCS 516, for example, information from VM-SLO table 520.

Host system 502 may be, include, or be included as part of host system 102 and/or one or more host systems 14a-14n described above. Host system 502 may include any of: one or more hardware components 512, an MP driver 510, a virtualizer 508, a VM-SLO assignment table 514, one or more VMs 504, 506, other components (not shown); or any suitable combination of the foregoing. The one or more virtual machines 504, 506 may run as threads of a virtualizer 508 running on host system 502, the virtualizer 508 controlling a virtualization of hardware components 512 for each VM 504, 506. The virtualizer 508 may serve as an operating system of the host system 502 or provide many key components (e.g., a kernel) of an operating system (e.g., serve as a Type I "bare metal" hypervisor like the ESXi hypervisor) or may itself be a software application running as a process of an underlying operating system (e.g., as a Type II "hosted" hypervisor). It should be appreciated that while only two VMs 504 and 506 are illustrated, any number of VMs can be running on host system 502 under control of the virtualizer 508, to the extent possible given the compute and memory resources of the host system 502 and capabilities of virtualizer 508.

Host system 502 may be implemented as a server, and one or more applications may be executing on the host system, for example, within one of the virtual machines 504, 506, or independently of any VM (e.g., independently of virtualizer 508, communicating directly with an operating system on host 502). An I/O request (specifying an I/O operation) originating from the one of the VMs 504, 506 may be communicated to the data storage system 540 using the MP driver 510, perhaps in conjunction with one or more other components (not shown). MP driver 510 may be, include or be included within MP driver 108 described above, and may have any of the capabilities of MP driver 108. In addition, MP driver 510 may be configured to communicate with virtualizer 508 and utilize VM-SLO assignment table 514, as described in more detail elsewhere herein.

One or more applications may execute within each VM executing on host system 502, including VMs 504, 506. Each application may be a database or other application for which the VM issues data operations, such as I/O operations, to the data storage system 540 via virtualizer 510. The number of VMs and the association of VMs to applications, business entities, business units within a business entity, locations (site, building, floor, etc) may be configured in any of a variety of ways depending on any of a variety of factors. For example, in some embodiments, VMs may be configured to be specific to business units, whereas in some embodiments VMs may be specific to applications or specific to applications utilized by a particular business unit.

As described in more detail elsewhere herein, associations between VMs and SLOs may be communicated from storage system 540 to host system 502, and also may be communicated to the host system 502 from VCS 516, another host system (e.g., host system 524) or another component of network 500. For example, the host system 502 (e.g., MP driver 510) may log into storage system 540 (e.g., when host system 502 is powered on, refreshed or rebooted), and, during the log-in process, may issue a VU SCSI command to the storage system to read the VM-SLO assignment table 546, in response to which the storage system 540 may communicate the contents of the VM SLO assignment table 546, or at least the portions corresponding to VMs running on the host system, to the host system 502. The host system 502 may store the VM-SLO assignments on the host system. For example, the MP driver, one or more other components on host system 502, or a combination thereof may store the VM-SLO associations, for example, a copy of the VM SLO assignment table, or a copy of one or more portions thereof corresponding to VMs running on the host system, as VM-SLO assignment table 514. In some embodiments, the MP driver 510 and/or other component may determine the VMs currently running on the host system 502 and assign a SLO ID to each VM, for example, in VM-SLO assignment table 514, as described in more detail elsewhere herein.

Figure 7A:
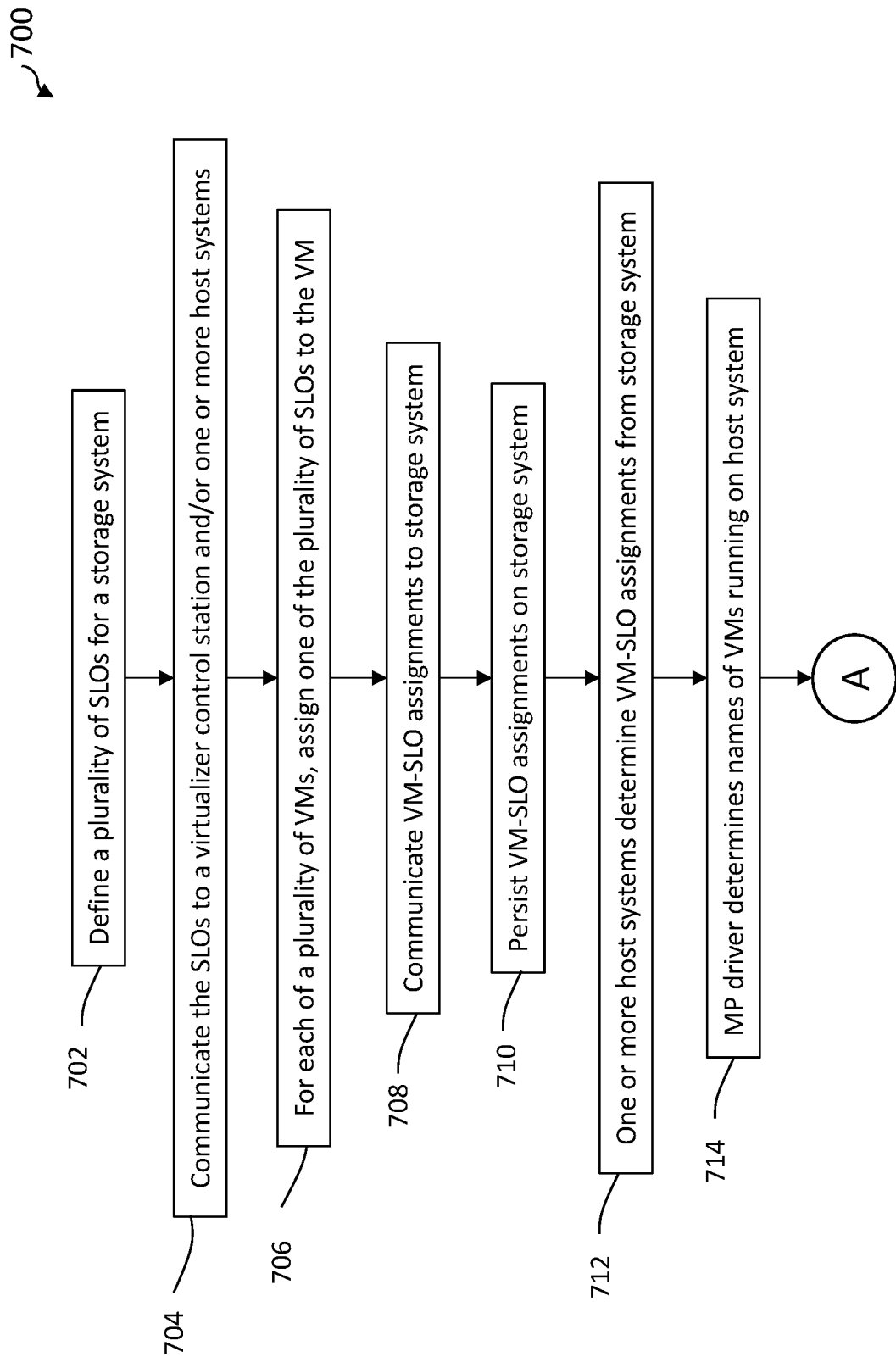
FIGS. 7A and 7B collectively are a flow chart illustrating an example of a method of associating service level objectives defined by a storage system with virtual machines running on host systems, according to embodiments of the invention.
Figure 7B:
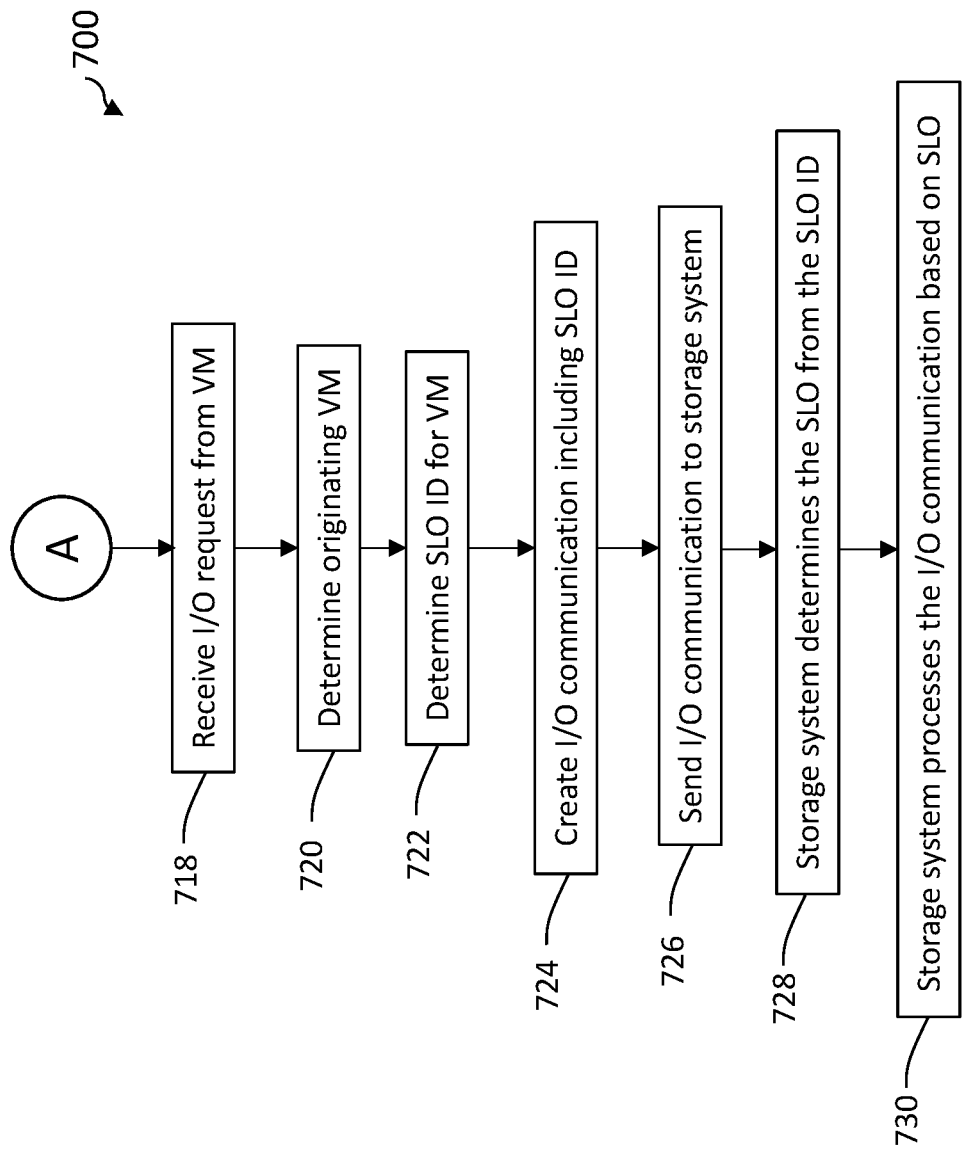

As described in more detail in relation to FIGS. 7A and 7B, MP driver 510 may be configured to communicate with virtualizer 508 to determine a VM ID (e.g., name) associated with each I/O operation received at virtualizer 508, determine the SLO ID associated with the VM, for example, using VM SLO-ID table 514; and create an I/O communication that includes the I/O operation with the SLO ID (or append the SLO ID to an existing I/O communication for the I/O operation) that is sent from the host system 502 to the storage system 540. For example, an unused field (e.g., group ID field) of a command descriptor block (CMD) of a SCSI communication may be populated with the SLO ID and sent to the storage system.

The form of the value to be used for SLO ID may be selected in consideration of how the SLO ID will be communicated to other components on network. For example, if a field to be used for communication (e.g., the group ID field of an SCSI CDB) is limited to five bits, then it may be desirable to use an integer having a value of 0-15 as a SLO ID, for example, in embodiments when 15 or fewer SLOs are being used. The MP driver 510, another component of host system 502 (or even another component of storage network 500) may be configured to populate VM-SLO assignment table 514 for the VMs running on host system 502, for example, using information conveyed by the storage system or VCS as described in more detail elsewhere herein.

Host system 524 may include any of: VM3 526, VM4 528, virtualizer 532, MP driver 534, hardware 536 and VM-SLO assignment table 530, which may be configured at least similar to components of the same name of host system 502 and perform at least similar functions thereto.

Storage Management Module 522 may be configured to enable a user to perform one or more management functions on storage system 540, for example, creating SLOs, assigning SLOs to VMs or SGs, other functions and communication of any of the foregoing to other components of network 500. For example, storage management module 522 may be configured to implement any of Solutions Enabler™ software, Unisphere™ software or other storage management products made available from Dell EMC. In some embodiments, at least some of the storage system management functions may be embodied in the storage system itself, for example, as part of a management module control station (MMCS) of a PowerMax™ system made available from Dell EMC.

FIGS. 7A and 7B collectively are a flowchart illustrating an example of a method 700 of associating SLOs defined by a storage system with virtual machines running on host systems, according to embodiments of the invention. Other examples of a method of associating SLOs defined by a storage system with virtual machines running on host systems, for example, variations of method 700, are possible and intended to fall within the scope of the invention.

In step 702, a plurality of SLOs may be defined for a storage system (e.g., storage system 540). For example, SLOs may be defined using a user interface of a storage system, host system, VCS or other component of a storage network. If not defined on the storage system itself, the SLOs may be communicated to the storage system, which may persist and maintain the SLOs. These SLOs may be stored in an SLO table (e.g., SLO table 545). In step 704, the SLOs may be communicated to a VCS (e.g., VCS 516), one or more host systems (e.g., host systems 502, 524) or other system components.

In step 706, for each of a plurality of VMs, one of the plurality of SLOs may be assigned to the VM. For example, a VCS (e.g., VCS 516) may be configured to allow a user to associate (e.g., assign) SLOs to known VMs running on one or more host systems (e.g., host systems 502, 524), and may be configured to do so for VMs it later configures to run on host systems. The assignment of SLOs to VMs may be recorded and maintained, for example, in VM-SLO assignment table 520 described above in relation to FIG. 5.

In step 708, VM-SLO assignments may be communicated to a storage system. For example, contents of VM-SLO table 520 may be communicated to storage system 540. The VM-SLO assignments may be similarly communicated to other components of a storage network, including host systems.

In step 710, the VM-SLO assignments may be persisted on a storage system, for example, in VM-SLO assignment table 546 described in more detail elsewhere herein.

In step 712, one or more host systems (e.g., an MP driver thereof) may determine VM-SLO assignments from a storage system (if not already communicated to them by the storage system or VCS). For example, in some embodiments, the host system 502 or 524 may log into storage system 540 (e.g., when host system is powered on, refreshed or rebooted), and, during the log-in process, the host system (e.g., MP driver 510, 534) may issue a vendor-unique (VU) SCSI command to the storage system to read VM-SLO assignment table 546, and the storage system 540 may communicate the contents of the VM SLO assignment table 546, or at least the portions corresponding to VMs (e.g., 504, 506, 526 or 528) running on the host system, to the host system 502 or 524, respectively. For example, the MP driver 510, 534, one or more other components on host system 502, 524 or a combination thereof, respectively, may store the VM-SLO associations, for example, a copy of the VM SLO assignment table 546, or a copy of one or more portions thereof corresponding to VMs running on the host system, in a VM-SLO assignment table (e.g., 514, 530).

In step 714, the MP driver (e.g., 510, 534) or another component of the host system may determine names of VMs running on the host system, for example, using VM handles provided by a virtualizer (e.g., 508, 532). That is, in some embodiments, the VM of an I/O operation is not specified in an I/O operation passed from the virtualizer to MP driver, but rather each I/O operation passed from the virtualizer to the MP driver includes a process ID identifying the operating system (OS) process (i.e., thread) of the virtualizer. However, the virtualizer also may include a VM handle (e.g., reference) along with the I/O operation from which the MP driver can determine the VM by making API calls to the virtualizer using the VM handle if so desired. Making such API calls may impose a relatively high performance hit on the host system. Accordingly, in some embodiments, such calls are not made for every I/O operation, but rather, for example, are made periodically, e.g., once every hour, minute or second, or a predefined multiple thereof. The determined VM name for the VM handle may be cached (i.e., stored in non-volatile cache memory) by the MP driver and used to determine the VM name for each I/O operation including the handle, until a next determination of the VM name for the respective process. It should be appreciated that it is possible, even if unlikely, that the VM name associated with a handle may change during the interval between which the VM name is determined. The length of the temporal interval (e.g., 1 second, 5 minutes, 30 minutes, 1 hour, etc.) may be selected to balance the likelihood of the VM associated with a VM handle changing during the interval with the performance cost of making the API call.

In step 718, an I/O request may be received from a VM (e.g., any of those illustrated in FIG. 5) running on the host system, and, in step 720, the MP driver or another component on the host system may determine an originating VM of the I/O request, for example, based on a VM handle provided by the virtualizer, e.g., by accessing the VM name associated with the VM handle in cache. In step 722, an SLO ID associated with the VM may be determined, for example, by the MP driver. For example, an entry in a VM-SLO assignment table (e.g., 514, 530) for the VM determined in step 720 may be accessed, from which the associated SLO may be determined.

In step 724, an I/O communication may be created for the I/O operation of the I/O request received in step 718, and the I/O communication may be tagged with the SLO ID determined in step 722; i.e., the I/O communication may be populated with the SLO ID determined in step 718. The I/O communication may be a SCSI communication including a CDB, and a predefined field (e.g., group ID field) of the CDB not being used for other purposes may be populated with the SLO ID.

In step 726, the host system may send the I/O communication to the storage system (e.g., 540). In step 728, the storage system (e.g., a director thereof) may determine the SLO from the SLO ID; for example, by reading the group ID field of a SCSI CDB, and may process the I/O communication based on the SLO determined in step 730.

Steps 718-730 may be repeated for each I/O received from a VM on one or more hosts. It should be appreciated that the order of performance of the steps of method 700 are not limited to the order illustrated in FIGS. 7A and 7B, and that some steps or portions thereof may be performed in parallel with other steps or portions thereof. For example, any of steps 718-730 may be performed for an I/O request concurrently to any of steps 718-730 being performed for another I/O request.

Is some embodiments of the invention, the storage system also may be configured with capability to determine SLOs for I/O operations based on the storage group (SG) associated with the I/O operation. In some embodiments, an SG-defined SLO may be overridden by the SLO associated with a VM of the I/O operation. For example, if it is determined from an I/O communication received from a host system (e.g., from group ID field of an SCSI CDB) that a VM-specific SLO has been specified, the VM-specific SLO may override the SG-defined SLO. In some embodiments, the storage system may define a default SLO value (e.g., Optimized) for all SGs, which then may be overridden by a VM-specific SLO if specified.

In some embodiments, it may be determined that a certain majority (e.g., >90%) of SGs on the storage system map one-to-one to VMs on the host system, in which case it may be decided that it is not desirable to implement VM-specific SLOs on the storage system; e.g., because of the amount of resources consumed to do so, when in most cases the SG-specific SLOs are consistent with the VM-specific SLOs. Alternatively, a decision may be made to implement the system and techniques herein with respect to associating storage system SLOs with VMs, for example, if it is determined that there is less of a one-to-one correlation (e.g., below a certain threshold) between SGs and VMs.

Using the systems and techniques described herein, host systems, including multi-path drivers thereof, can apply SLOs to VMs that are consistent between the host system and storage system. Further, the storage system can apply VM-specific SLOs to I/O operations on the host system, and apply a consistent set of SLOs for VMs across multiple host systems. Further, in the event an SLO is not defined for a VM, the storage system can still apply SG-defined SLOs and/or a default SLO value (e.g., Optimized) to VM I/O operations on the storage system.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 700, or parts thereof, may be implemented using one or more of the systems, data structures and/or displays described in relation to FIGS. 1A-6 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of applying a plurality of service level objectives defined for a storage system of a storage network to a plurality of virtual machines defined for a plurality of host systems of the storage network, the method comprising:
   defining the plurality of service level objectives for the storage system to apply to I/O operations on the storage system;
   the storage system communicating the plurality of service level objectives to one or more other components of the storage network;
   receiving an I/O communication including an I/O operation to be performed for a first virtual machine of the plurality of virtual machines;
   determining a first service level objective, of the plurality of service level objectives, assigned to the first virtual machine; and
   processing the I/O operation on the storage system in accordance with the determined first service level objective.

2. The method of claim 1, wherein the one or more other components include the plurality of host systems.

3. The method of claim 1, wherein the one or more other components include a virtualizer control station on the storage network.

4. The method of claim 1, further comprising:
   receiving information for the plurality of virtual machines, the information including, for each of the plurality of virtual machines, a service level objective, of the plurality of service level objectives, assigned to the virtual machine.

5. The method of claim 4, furthering comprising:
   storing the received information in a data structure on the storage system, the data structure including a plurality of entries, each entry representing one of the plurality of virtual machines and specifying a service level objective assigned to the virtual machine.

6. The method of claim 4, wherein the plurality of virtual machines includes at least one virtual machine from a first of the plurality of host systems, and at least one virtual machine from a second of the plurality of host systems.

7. The method of claim 1, wherein determining the first service level objective includes reading a field of the I/O communication that specifies the service level objective.

8. A system for applying a plurality of service level objectives defined for a storage system of a storage network to a plurality of virtual machines defined for a plurality of host systems of the storage network, the system comprising:
   one or more processors; and
   memory comprising code stored thereon that, when executed, performs a method comprising:
      defining the plurality of service level objectives for the storage system to apply to I/O operations on the storage system;
      the storage system communicating the plurality of service level objectives to one or more other components of the storage network;
      receiving an I/O communication including an I/O operation to be performed for a first virtual machine of the plurality of virtual machines;
      determining a first service level objective, of the plurality of service level objectives, assigned to the first virtual machine; and
      processing the I/O operation on the storage system in accordance with the determined first service level objective.

9. The system of claim 8, wherein the one or more other components include the plurality of host systems.

10. The system of claim 8, wherein the one or more other components include a virtualizer control station on the storage network.

11. The system of claim 8, wherein the method further comprises:
    receiving information for the plurality of virtual machines, the information including, for each of the plurality of virtual machines, a service level objective, of the plurality of service level objectives, assigned to the virtual machine.

12. The system of claim 11, wherein the method further comprises:
    storing the received information in a data structure on the storage system, the data structure including a plurality of entries, each entry representing one of the plurality of virtual machines and specifying a service level objective assigned to the virtual machine.

13. The system of claim 11, wherein the plurality of virtual machines includes at least one virtual machine from a first of the plurality of host systems, and at least one virtual machine from a second of the plurality of host systems.

14. The system of claim 8, wherein determining the first service level objective includes reading a field of the I/O communication that specifies the service level objective.

15. One or more non-transitory computer-readable media, the computer-readable media having software stored thereon defining a method of applying a plurality of service level objectives defined for a storage system of a storage network to virtual machines defined for one or more host systems of the storage network, the software comprising:
    executable code that defines the plurality of service level objectives for the storage system to apply to I/O operations on the storage system;
    executable code that controls the storage system to communicate the plurality of service level objectives to one or more other components of the storage network;
    executable code that receives an I/O communication including an I/O operation to be performed for a first virtual machine of the plurality of virtual machines;
    executable code that determines a first service level objective, of the plurality of service level objectives, assigned to the first virtual machine; and
    executable code that processes the I/O operation on the storage system in accordance with the determined first service level objective.

16. The one or more non-transitory computer-readable media of claim 15, wherein the one or more other components include at least one of: the one or more host systems; and a virtualizer control station.

17. The one or more non-transitory computer-readable media of claim 15, wherein the software further comprises:
    executable code that receives information for the plurality of virtual machines, the information including, for each of the plurality of virtual machines, a service level objective, of the plurality of service level objectives, assigned to the virtual machine.

18. The one or more non-transitory computer-readable media of claim 17, wherein the software further comprises:
executable code that stores the received information in a data structure on the storage system, the data structure including a plurality of entries, each entry representing one of the plurality of virtual machines and specifying a service level objective assigned to the virtual machine.

19. The one or more non-transitory computer-readable media of claim 17, wherein the plurality of virtual machines includes at least one virtual machine from a first of the one or more host systems, and at least one virtual machine from a second of the one or more host systems.

20. The one or more non-transitory computer-readable media of claim 15, wherein executable code that determines the first service level objective includes executable code that reads a field of the I/O communication that specifies the service level objective.

\* \* \* \* \*